(12) United States Patent
Johansson et al.

(10) Patent No.: US 9,132,836 B2
(45) Date of Patent: Sep. 15, 2015

(54) MODULE FOR DETERMINING SET-POINT VALUES FOR CONTROL SYSTEMS IN A VEHICLE

(75) Inventors: Oskar Johansson, Stockholm (SE); Jörgen Hansson, Hägersten (SE); Henrik Pettersson, Södertälje (SE); Fredrik Swartling, Södertälje (SE)

(73) Assignee: SCANIA CV AB (SE)

( * ) Notice: Subject to any disclaimer, the term of this patent is extended or adjusted under 35 U.S.C. 154(b) by 183 days.

(21) Appl. No.: 13/377,304

(22) PCT Filed: May 31, 2010

(86) PCT No.: PCT/SE2010/050592
§ 371 (c)(1),
(2), (4) Date: Jan. 26, 2012

(87) PCT Pub. No.: WO2010/144029
PCT Pub. Date: Dec. 16, 2010

(65) Prior Publication Data
US 2012/0123651 A1  May 17, 2012

(30) Foreign Application Priority Data

Jun. 10, 2009  (SE) .................................. 0950437-4

(51) Int. Cl.
*B60W 30/14* (2006.01)
*B60W 10/06* (2006.01)
(Continued)

(52) U.S. Cl.
CPC ............. *B60W 30/143* (2013.01); *B60W 10/06* (2013.01); *B60W 10/10* (2013.01); *F16H 59/66* (2013.01);
(Continued)

(58) Field of Classification Search
CPC .................. B60W 30/143; B60W 2550/142
USPC ............................................ 701/51, 93, 94, 95
See application file for complete search history.

(56) References Cited

U.S. PATENT DOCUMENTS 5,832,400 A    11/1998  Takahashi et al.
6,070,118 A *   5/2000  Ohta et al. ...................... 701/65
(Continued)

FOREIGN PATENT DOCUMENTS

DE  10 2006 001 818 A1  7/2007
JP       07117524 A     5/1995
SE         529578 C2    9/2007
WO    WO 03/041988     5/2003

OTHER PUBLICATIONS

International Search Report dated Sep. 10, 2010, issued in corresponding international application No. PCT/SE2010/050592.

*Primary Examiner* — John R Olszewski
*Assistant Examiner* — Todd Melton
(74) *Attorney, Agent, or Firm* — Ostrolenk Faber LLP

(57) ABSTRACT

A module for determining speed set-point values $v_{ref}$ for a vehicle's control systems includes an input unit configured for input, e.g. by the vehicle's driver, of a reference speed $v_{set}$ which is the speed desired by the driver for the vehicle. A horizon unit is configured for determining a horizon by means of received position data and map data of an itinerary made up of route segments with at least one characteristic for each segment. A processor unit is configured for calculating $v_{ref}$ across the horizon according to rules pertaining to categories in which segments within the horizon are placed, so that $v_{ref}$ is within a range bounded by $v_{min}$ and $v_{max}$, where $v_{min} \leq v_{set} \leq v_{max}$. The processor unit is further configured for determining a control signal with control parameters for the vehicle's automatic gear change control unit, based on one or more vehicle-specific values and a calculated speed set-point value $v_{ref}$.

17 Claims, 3 Drawing Sheets

(51) Int. Cl.
  *B60W 10/10* (2012.01)
  *F16H 59/66* (2006.01)
  *F16H 61/02* (2006.01)
(52) U.S. Cl.
  CPC ...... *F16H 61/0213* (2013.01); *B60W 2550/402* (2013.01); *B60W 2720/10* (2013.01); *B60W 2720/103* (2013.01); *F16H 2059/666* (2013.01); *F16H 2061/0216* (2013.01); *Y02T 10/52* (2013.01)

(56) References Cited

U.S. PATENT DOCUMENTS

| | | | |
|---|---|---|---|
| 8,315,775 B2 * | 11/2012 | Biondo et al. | 701/93 |
| 2003/0204298 A1 | 10/2003 | Ahmed-Zaid et al. | |
| 2004/0068359 A1 | 4/2004 | Neiss et al. | |
| 2007/0265759 A1 * | 11/2007 | Salinas et al. | 701/93 |
| 2008/0188996 A1 | 8/2008 | Lucas et al. | |

* cited by examiner

MODULE FOR DETERMINING SET-POINT VALUES FOR CONTROL SYSTEMS IN A VEHICLE

CROSS-REFERENCE TO RELATED APPLICATIONS

The present application is a 35 U.S.C. §§371 national phase conversion of PCT/SE2010/050592, filed May 31, 2010, which claims priority of Swedish Application No. 0950437-4, filed Jun. 10, 2009, the contents of which are incorporated by reference herein. The PCT International Application was published in the English language.

FIELD OF THE INVENTION

The present invention relates to a module for determining set-point values for control systems in a vehicle.

BACKGROUND TO THE INVENTION

Many vehicles today are equipped with a cruise control to make it easier for the driver to drive the vehicle. The desired speed can then be set by the driver, e.g. via a control device in the steering wheel console, and a cruise control system in the vehicle acts thereafter upon a control system so that it accelerates and brakes the vehicle in order to maintain a desired speed. If the vehicle is equipped with an automatic gear change system, the vehicle's gears are changed so that the vehicle can maintain the desired speed.

When a cruise control is used in hilly terrain, the cruise control system will try to maintain a set speed on upgrades. This results inter alia in the vehicle accelerating over the crest of a hill and possibly into a subsequent downgrade, making it necessary to brake to avoid exceeding the set speed, which is a fuel-expensive way of running the vehicle.

By varying the vehicle's speed in hilly terrain it is possible to save fuel as compared with a conventional cruise control. This may be done in various ways, e.g. by calculations of the vehicle's current state (as with Scania Ecocruise®). If an upgrade is calculated, the system then accelerates the vehicle uphill. Towards the end of the climb, the system is programmed to avoid acceleration until the gradient has levelled out at the top, provided that the vehicle's speed does not drop below a certain level. Lowering the speed at the end of an upgrade makes it possible to regain speed on a subsequent downgrade without using the engine to accelerate. When the vehicle approaches the bottom of a dip, the system endeavours to use kinetic energy to embark on the next upgrade at a higher speed than an ordinary cruise control. The system will easily provide acceleration at the end of the downgrade in order to maintain the vehicle's momentum. In undulating terrain, this means that the vehicle starts the next climb at a higher speed than normal. Avoiding unnecessary acceleration and using the vehicle's kinetic energy makes it possible to save fuel.

If the topology ahead is made known by the vehicle having map data and GPS, such a system can be made more robust and can also change the vehicle's speed in anticipation.

There are existing systems which incorporate the topology ahead in the calculations for the vehicle's speed by doing real-time optimisations of the vehicle's speed across an itinerary. This may result in a very heavy computation load on the hardware in a real-time system in a vehicle, since such systems often have limited resources in terms of memory and processor power. Even doing ordinary calculations and simulations on line across the known route profile may represent a heavy computation load. If for example the precision or resolution of the horizon vectors for calculating road gradients is too great, unnecessary computation power is also involved.

A way of sparing the vehicle's computation power is referred to in published patent application US 2008/0188996 which refers to a driver assistance system in which a number of sensors supply attendant traffic factors and create hypotheses which are logically related to one another. However, that system is not related to cruise control of vehicles.

One of the objects of the present invention is to propose an improved system for determining set-point values for control systems in a vehicle which in particular reduces the amount of computation power needed when set-point values for the vehicle's control systems have to be regulated A further aspect is that traditional automatic gear change systems can only take decisions about which is the best gear for the current driving situation on the basis of what is known at the time. Current engine speed and engine load are typically key variables for selecting the right gear.

In a modern vehicle, the engine, the gearbox, the retarder (if the vehicle is equipped with it) and the brakes are controlled by means of an automatic gear change control unit, (e.g. Scania Opticruise®). The automatic gear change control unit serves as an electronic link between two or more of these functions, enhancing the driver's facilities for controlling them. For example, the speed of the engine and the gearbox is adapted before the system changes one or more steps up or down. Gear changing becomes gentle and quick, improving fuel economy and protecting the driveline.

As the itinerary is not known in traditional systems, unnecessary gear changes are sometimes made, e.g. at the end of an upgrade when changing down may become necessary before the crest despite the fact that the intuitive choice for a driver would be to continue in the same gear. A late downward change is often followed by an upward change because the running resistance decreases at the crest. Such gear changes cause unnecessary fuel losses as compared with a condition where changing gear down could be avoided.

There are also other cases where it is good practice to change gear before an upgrade in order to be already in the right gear at the beginning of the climb, inter alia because the gear change will be less disturbing to comfort if it takes place before the climb when there is less load on the engine and less speed will be lost during the gear change. The right gear means having sufficient torque margin to carry on climbing longer.

U.S. Pat. No. 5,832,400 describes a system which by means of GPS and map data supplies and anticipates gradient and engine load, inter alia by using information about topography and the vehicle's geographical position.

WO 03/041988 relates to control of gear changing in a motor vehicle. This is effected inter alia by setting up a gear change configuration with automatic gear selection calculated for a longer time ahead, using instantaneous position information obtained by means of GPS and future positions given by information from an electronic map.

A further object of the present invention is to propose improved control of the automatic gear change system in a vehicle which results inter alia in more optimum running in hilly terrain with regard to fuel consumption and driveline wear and which at the same time is comfortable for the driver.

SUMMARY OF THE INVENTION

The objects described above are achieved by the invention disclosed herein.

The fact that the topology is known can be used to estimate future engine load. The notional speed in the cruise control is also used in conjunction with engine load estimation to estimate the future engine speed.

The module according to the present invention simulates an internal running resistance model of the topology ahead at the speed $v_{ref}$ which the cruise control will request. This is used to calculate an estimate of necessary torque and desired engine speed across the future horizon which are required for maintaining the speed $v_{ref}$.

According to an embodiment of the present invention, the control system supplies three different control parameters to the vehicle's automatic gear selection system:
1. A flag indicating that the automatic gear change system should preferably not change gear up.
2. A desired speed limit for changing gear down.
3. If the vehicle is climbing a hill classified as "steep upgrade", i.e. with insufficient engine torque to maintain speed, the following are sent:
   Average gradient and distance from the point where the system thinks that the vehicle will be able to maintain its speed.
   Desired engine speed at the point where the system thinks that the vehicle will be able to maintain its speed.

One of the advantages of the present invention is that the vehicle has automatic gear selection which can more reliably select the right gear, thereby improving fuel economy and performance. The system also manages to preselect the right gear precisely as a competent active driver might.

Another advantage is that on an upgrade the system can allow a later gear change, or completely avoid changing gear down, after it has incorporated information about a lower engine speed for changing gear down and has weighed this in conjunction with physical limitations due to low engine speed and other regulating.

It is also possible to prevent unnecessary gear changes which might be triggered by changes in the speed set-point value and hence in load.

On certain downgrades where it is desired to roll downhill, engaging a higher gear earlier may result in a lower drag torque. On steep downgrades it may be advantageous to engage a lower gear earlier in order to gain more engine brake power.

According to the present invention, the automatic gear change system is provided with information inter alia about other speed limits, distance to crest and average gradient, thereby improving fuel economy and running characteristics.

Using the module according to the invention makes it possible to minimise the amount of fuel needed during the vehicle's journey by taking information about the itinerary into account. Map data, e.g. in the form of a database on board the vehicle with altitude information, and a positioning system, e.g. GPS, provide information about road topography along the itinerary. Control systems, in particular the automatic gear change control unit, are thereafter supplied with set-point values and control parameters and regulate the vehicle according to them.

BRIEF DESCRIPTION OF THE ATTACHED DRAWINGS

DETAILED DESCRIPTION OF PREFERRED EMBODIMENTS OF THE INVENTION

The invention is described below in detail with reference to the attached drawings.

Information about a vehicle's itinerary can be used to regulate its set-point speed $v_{ref}$ for the cruise control in the vehicle in anticipation in order to save fuel, increase safety and enhance comfort. Other set-point values for other control systems may also be regulated. Topography greatly affects the control of, in particular, the driveline of heavy vehicles, since much more torque is required uphill than downhill and to make it possible to climb some hills without changing gear.

The vehicle is provided with a positioning system and map information, and position data from the positioning system and topology data from the map information are used to construct a horizon which illustrates the nature of the itinerary. In the description of the present invention, GPS (Global Positioning System) 10 is indicated for determining position data for the vehicle, but it should be appreciated that other kinds of global or regional positioning systems are also conceivable to provide the vehicle with position data, e.g. systems which use a radio receiver to determine the vehicle's position. The vehicle may also use sensors to scan the surroundings and thereby determine its position.

Figure 1:
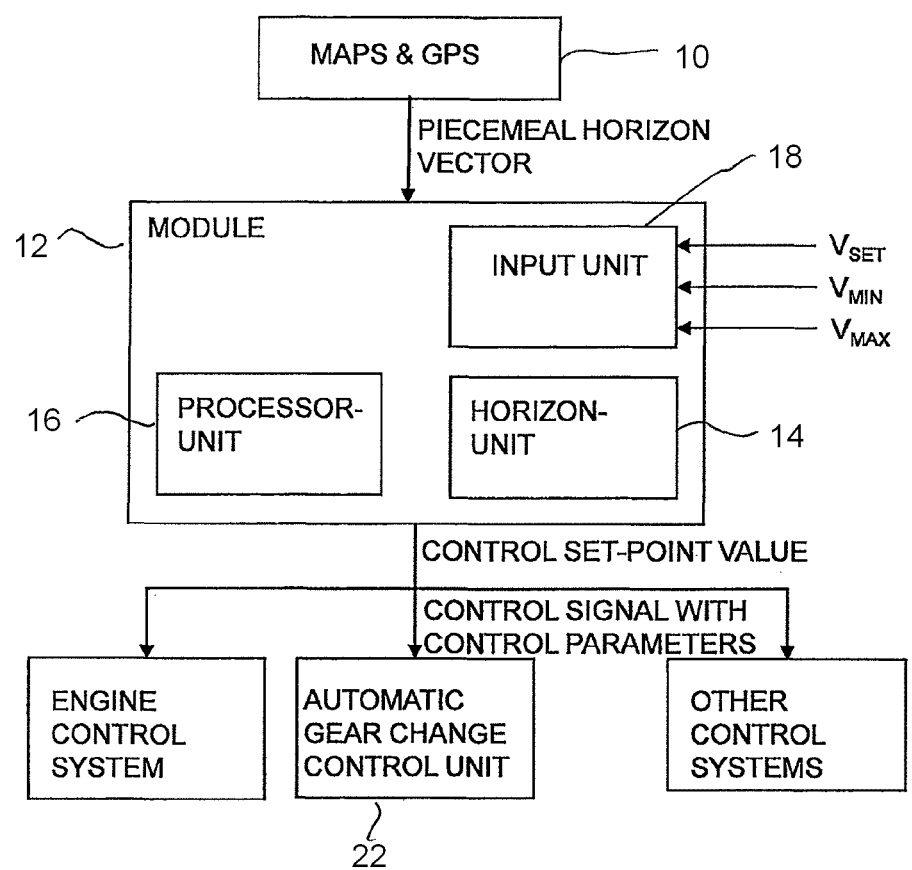
FIG. 1 depicts the functional context of the regulating module in the vehicle according to an embodiment of the invention.

FIG. 1 illustrates how a unit incorporates map and GPS information 10 about the itinerary. The itinerary is exemplified below as a single route for the vehicle but it should be appreciated that various conceivable itineraries are incorporated as information via maps and GPS or other positioning systems. The driver may also register the starting point and destination point of the intended journey, in which case the unit uses map data etc. to calculate a suitable route. The itinerary or, if there are two or more possible alternatives, the itineraries are sent bit by bit via CAN (Controller Area Network), a serial bus system specially adapted for vehicles, to a module for regulation of set-point values, which module may be separate from or form part of the systems which are to use the set-point values for regulating. Alternatively, the unit with maps and a positioning system may also be part of a system which uses the set-point values for regulating. In the regulating module, the bits are put together in a horizon unit to form a horizon and are processed by the processor unit to create an internal horizon by which the control system can regulate. If there are two or more alternative itineraries, a number of internal horizons are created for the various alternatives. The control system may be any of the various control systems in the vehicle, e.g. cruise control, gearbox control system or some other control system. A horizon is usually put together for each control system, since the control systems regulate by different parameters. The horizon is then continually supplemented by new bits from the unit with GPS and map data to maintain a desired length of horizon. The horizon is thus updated continuously when the vehicle is in motion.

CAN is thus a serial bus system specially developed for use in vehicles. The CAN data bus makes digital data exchange possible between sensors, regulating components, actuators, control devices, etc. and ensures that two or more control devices can have access to the signals from a given sensor in order to use them to control components connected to them.

The present invention relates to a module for determining set-point values for a vehicle's control system, in particular for determining a control signal with control parameters for the vehicle's automatic gear change control system, which module 12 is schematically illustrated in FIG. 1.

In overall terms, the control parameters define how to cause the automatic gear change system to select the right gear before an imminent hill, inter alia to prevent unnecessary gear changing near to the end of the hill.

The invention, as schematically illustrated in FIG. 1, thus relates to a module 12 for determining speed set-point values $v_{ref}$ for a vehicle's control systems, comprising an input unit 18 adapted to input, e.g. by the vehicle's driver, a reference speed $v_{set}$ which is the speed desired by the driver for the vehicle.

The module 12 comprises:
a horizon unit 14 adapted to determining a horizon by means of received position data and map data of an itinerary made up of route segments with at least one characteristic for each segment;
a processor unit 16 adapted to calculating $v_{ref}$ across the horizon according to rules pertaining to categories in which segments within the horizon are placed, so that $v_{ref}$ is within a range bounded by $v_{min}$ and $v_{max}$, where $v_{min} \leq v_{set} \leq v_{max}$.

The processor unit 16 is further adapted to determining a control signal with control parameters for the vehicle's automatic gear change control unit 22, based on one or more vehicle-specific values and a calculated speed set-point value $v_{ref}$ across the future horizon.

The vehicle-specific values are determined by current transmission ratio, current vehicle weight, the engine's maximum torque curve, mechanical friction and/or the vehicle's running resistance at current speed.

According to an embodiment, the processor unit 16 is adapted to calculate engine load and engine speed across the future horizon on the basis of the vehicle-specific values, and to use the calculated values for engine load and/or engine speed to determine said one or more control parameters.

When the engine load has been calculated on the basis of said vehicle-specific values across the horizon, the engine speed can also be estimated and the processor unit 16 can thereafter supply the automatic gear change control unit 22 with the input data, via the control parameters, required for optimum control of the automatic gear change system throughout the horizon. The control parameters preferably comprise, according to an embodiment, one or more of the following:
the engine's speed limits for changing gear,
distance to crest of hill,
average gradient of hill.

To enable the processor unit 16 to accomplish this, it is provided with a memory unit in which specific relationships between engine load, engine speed and vehicle-specific speed limits for changing gear up and down are stored. These relationships may be stored in the form of one or more tables or in matrix form. An alternative is for the information to be obtained from another unit.

When the vehicle is near to or on a steep upgrade, the distance to the transition from steep upgrade to some other segment category, i.e. the point where the vehicle changes from torque deficit to torque surplus, is sent. The desired speed simulated by the internal vehicle model, or an engine speed corresponding to the current gear at the aforesaid point, is also sent.

When temporary speed increases above the set speed adopted by the driver, e.g. a speed increase before a steep upgrade, occur, a flag which prevents changing up of gears is sent.

The average gradient supplied to the automatic gear change system is calculated as the average value of the gradient of all constituent segments of the steep upgrade type.

According to an embodiment, the control signal supplied to the automatic gear change control unit 22 comprises one or more of the following control parameters:
lowest engine speed limit for changing gear down;
flag indicating whether an upward change of gear should take place;
gradient of current segment and remaining distance to a segment classified as "gentle upgrade" if the vehicle is on a segment classified as "steep upgrade";
desired speed at transition to "gentle upgrade" if the vehicle is on a segment classified as "steep upgrade".

The automatic gear change control unit 22 thereafter regulates the automatic gear change system inter alia according to the control parameters.

Set-point values $v_{ref}$ for the control system in the vehicle may thus be allowed to vary between the two aforesaid speeds $v_{min}$ and $v_{max}$. When the regulating module predicts an internal horizon for the vehicle's speed, the vehicle's speed may then vary within that range.

The result is a module which can be used in a vehicle to regulate set-point values in a computationally effective way, and the module may be part of a control system for which it is intended to regulate set-point values, or be a freestanding module separate from the control system.

The range $v_{min}$ and $v_{max}$ is preferably set manually by the driver via said input unit 18. For example, the limits of the range may be set by means of one or more buttons in the steering wheel or on the instrument panel.

Figure 2:
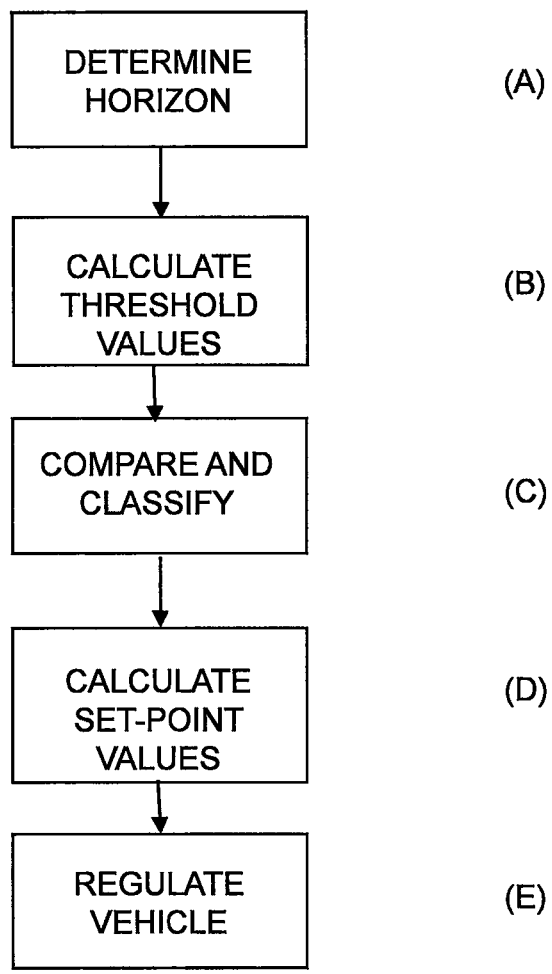
FIG. 2 depicts a flowchart for the steps which the module is adapted to performing according to an embodiment of the invention.

FIG. 2 is a flowchart which illustrates schematically the method steps which the module 12 is adapted to performing. In this context, a related patent application filed at the same time is also referred to.

A first step A) determines a horizon based on position data and map data of an itinerary made up of route segments with at least one characteristic for each segment. When the vehicle is on the move, the horizon module puts the bits together to form a horizon of the itinerary, the length of the horizon being typically of the order of 1 to 2 km. The horizon unit keeps track of where the vehicle is and continually adds to the horizon so that the length of the horizon is kept constant. When the destination point of the journey is within the length of the horizon, the horizon is preferably no longer added to, since travelling beyond the destination point is not relevant.

The horizon is made up of route segments which have one or more characteristics pertaining to them. The horizon is here exemplified in matrix form in which each column contains a characteristic for a segment. A matrix covering 80 m forward of an itinerary may take the following form:

$$\begin{bmatrix} dx, & \% \\ 20, & 0.2 \\ 20, & 0.1 \\ 20, & -0.1 \\ 20, & -0.3 \end{bmatrix}$$

where the first column is the length of each segment in metres (dx) and the second column the gradient in % of each segment. The matrix is to be taken to mean that for 20 metres forward from the vehicle's current position the gradient is 0.2%, followed by 20 metres with a gradient of 0.1%, and so on. The values for segments and gradients need not be expressed in relative values but may instead be expressed in absolute values. The matrix is with advantage formed by a vector but may instead be of a pointer structure, in the form of data packages or the like. There are various other conceivable characteristics, e.g. radius of curvature, traffic signs, various hindrances etc.

After step A), segments within the horizon are placed in various categories in a step B) in which threshold values are calculated for at least one characteristic of segments according to one or more vehicle-specific values, which threshold values serve as boundaries for assigning segments to different categories. In the example where the characteristics of segments are gradients, threshold values are calculated for their gradients. The threshold values for the characteristic concerned are calculated, according to an embodiment of the invention, by one or more vehicle-specific values, e.g. current transmission ratio, current vehicle weight, the engine's maximum torque curve, mechanical friction and/or the vehicle's running resistance at current speed. A vehicle model internal to the control system is used to estimate running resistance at current speed. Transmission ratio and maximum torque are known magnitudes in the vehicle's control system, and vehicle weight is estimated on-line.

The following are examples of five different categories in which segments may be placed when the gradient of segments is used for making decisions about the control of the vehicle:

Level road: Segment with gradient 0± a tolerance.
Steep upgrade: Segment with too steep a gradient for the vehicle to maintain speed in current gear.
Gentle upgrade: Segment with gradient between the positive tolerance and the threshold value for the steep upgrade.
Steep downgrade Segment with such a steep downhill gradient that the vehicle is accelerated by the gradient.
Gentle downgrade: Segment with a downward gradient between the negative tolerance and the threshold value for the steep downgrade.

According to an embodiment of the invention, the characteristics of segments are their length and gradient, and placing segments in the categories described above involves calculating threshold values in the form of two gradient threshold values $l_{min}$ and $l_{max}$, where $l_{min}$ is the minimum gradient for the vehicle to be accelerated by the gradient downhill, and $l_{max}$ is the maximum gradient at which the vehicle can maintain speed without changing gear uphill. Thus the vehicle can be regulated according to the gradient and length of the road ahead so that it can be driven in a fuel economising way by means of cruise control in undulating terrain. In another embodiment, the characteristics of the segments are their length and lateral acceleration, and threshold values are calculated in the form of lateral acceleration threshold values which classify segments by how much lateral acceleration they cause. The vehicle's speed can thereafter be regulated so that it can be driven in a way suited to fuel economy and traffic safety with regard to road curvature, i.e. any speed reduction before a bend is as far as possible effected without use of service brakes.

In a next step C) of the method, the characteristics, in this case the gradient, of each segment are compared with the calculated threshold values, and each segment is placed in a category by the results of the comparisons.

There might instead or in addition be for example similar classification by radius of curvature of the road, whereby bends might be classified by how much lateral acceleration they cause.

After each segment within the horizon has been placed in a category, an internal horizon for the control system can be constructed on the basis of the classification of segments and the horizon, comprising for each segment introductory speeds $v_i$ which the control system has to abide by. A speed change requested between two initial speeds $v_i$ is ramped in order to provide set-point values $v_{ref}$ for the control system which effect a gradual increase or decrease of the vehicle's speed. Ramping a speed change results in calculation of gradual speed changes which need to be made in order to achieve the speed change. In other words, ramping results in a linear speed increase. The introductory speeds $v_i$, i.e. set-point values for the vehicle's control systems, are calculated in a step D) according to the method according to the invention across the horizon according to rules pertaining to the categories in which segments within the horizon are placed. All the segments within the horizon are stepped through continuously, and as new segments are added to the horizon the initial speeds $v_i$ are adjusted in them as necessary within the range of the vehicle's reference speed $v_{set}$. $v_{set}$ is the reference speed set by the driver and desired to be kept by the vehicle's control systems within a range when the vehicle is in motion. As previously described, the range is bounded by two speeds $v_{min}$ and $v_{max}$ which may be set manually by the driver or be set automatically by calculations of suitable ranges preferably calculated in the regulating module. The vehicle is thereafter regulated in a step E) according to the set-point values, which in the example described means that the cruise control in the vehicle regulates the vehicle's speed according to the set-point values.

The vehicle-specific values of current transmission ratio, current vehicle weight, the engine's maximum torque curve, mechanical friction and/the vehicle's running resistance at current speed are preferably determined in the processor unit 16. The threshold values can therefore be determined on the basis of the vehicle's state at the time. Signals needed for determining these values may be taken from CAN or be detected by suitable sensors.

According to an embodiment, the characteristics of segments are their length and gradient and the processor unit is adapted to calculating the threshold values in the form of gradient threshold values $l_{min}$ and $l_{max}$. Thus the vehicle's speed can be regulated according to the undulation of the itinerary in order to travel in a fuel economising way.

According to another embodiment, the characteristics of segments are their length and lateral acceleration and the processor unit is adapted to calculating the threshold values in the form of lateral acceleration threshold values. This means that the vehicle's speed can be regulated according to the curvature of the road ahead, and the vehicle's speed can be pre-regulated so that unnecessary braking operations and speed increases are minimised in order to save fuel.

The horizon unit 14 is preferably adapted to determining the horizon continuously so long as the horizon does not exceed a planned itinerary for the vehicle, and the processor unit 16 is adapted to continuously performing the steps for calculating and updating the set-point values for the control system for the whole length of the internal horizon. In an embodiment, the horizon is thus constructed piecemeal progressively as the vehicle travels along the itinerary. The set-point values for the control system are calculated and updated continuously irrespective of whether new segments are added or not, since the set-point values to be calculated depend also on how the vehicle-specific values of the vehicle change along the itinerary.

The various rules for the segment categories therefore regulate how the initial speed $v_i$ for each segment is to be adjusted. If a segment is in the "level road" category, no change will take place in the initial speed $v_i$ to the segment. Driving the vehicle such that comfort requirements are met involves using Torricelli's equation as below to calculate the constant acceleration or retardation which needs to be applied to the vehicle:

$$v_{end}^2 = v_i^2 + 2 \cdot a \cdot s \quad (1)$$

where $v_i$ is the initial speed in the segment, $v_{end}$ the vehicle's speed at the end of the segment, a the constant acceleration/retardation and s the length of the segment.

If a segment is in the "steep upgrade" or "steep downgrade" category, the final speed $v_{end}$ for the segment is predicted by solving equation (2) below:

$$v_{end}^2 = (a \cdot v_i^2 + b) \cdot (e^{(2 \cdot a \cdot s/M)} - b)/a \quad (2)$$

where $$a = -C_d \cdot \rho \cdot A/2 \quad (3)$$

$$b = F_{track} - F_{roll} - F_\alpha \quad (4)$$

$$F_{track} = (T_{eng} \cdot i_{final} \cdot i_{gear} \cdot \mu_{gear})/r_{wheel} \quad (5)$$

$$F_{roll} = \text{flatCorr} \cdot M \cdot g/1000 \cdot (C_{rrisoF} + C_b \cdot (v_i - v_{iso}) + C_{aF} \cdot (v_i^2 - v_{iso}^2)) \quad (6)$$

$$F_\alpha = M \cdot g \cdot \sin(\arctan(\alpha)) \quad (7)$$

$$\text{flatCorr} = 1/\sqrt{(1 + r_{wheel}/2.70)} \quad (8)$$

where $C_d$ is the air resistance coefficient, $\rho$ the density of the air, A the largest cross-sectional area of the vehicle, $F_{track}$ the force acting from the engine torque in the vehicle's direction of movement, $F_{roll}$ the force from the rolling resistance acting upon the vehicle's wheels, calculated by using Michelin's rolling resistance model, $F_\alpha$ the force acting upon the vehicle because of the gradient $\alpha$ of the segment, $T_{eng}$ the engine torque, $i_{final}$ the vehicle's final gear, $i_{gear}$ the current transmission ratio in the gearbox, $\mu_{gear}$ the efficiency of the gear system, $r_{wheel}$ the vehicle's wheel radius and M the vehicle's weight.

On segments in the "steep upgrade" category, the final speed $v_{end}$ is thereafter compared with $v_{min}$, and if $v_{end} < v_{min}$, then $v_i$ has to be increased so that $$v_i = \min(v_{max}, v_i + (v_{min} - v_{end})) \quad (9)$$

otherwise no change in $v_i$ takes place, since $v_{end}$ meets the requirement of being within the range for the reference speed.

On segments in the "steep downgrade" category, the final speed $v_{end}$ is compared with vmax, and if $v_{end} > v_{max}$, then $v_i$ has to be decreased so that $$v_i = \max(v_{min}, v_i - (v_{end} - v_{max})) \quad (10)$$

otherwise no change in $v_i$ takes place, since $v_{end}$ meets the requirement of being within the range for the reference speed.

Torricelli's equation (1) is here again used to calculate whether it is possible to achieve $v_{end}$ with the initial speed $v_i$ with comfort requirement, i.e. with predetermined maximum constant acceleration/retardation. If this is not possible because of the length of the segment, $v_i$ is increased or decreased so that the comfort requirement, i.e. not too much acceleration/retardation, can be maintained.

On segments in the "gentle upgrade" category, the set-point value $v_{ref}$ is allowed to vary between $v_{min}$ and $v_{set}$ when a new segment is incorporated, i.e. $v_{min} \leq v_{ref} \leq v_{set}$. If $v_{ref} \geq v_{min}$, no acceleration of the vehicle is effected. If however $v_{ref} < v_{min}$, then $v_{ref}$ is increased to $v_{min}$ during the segment, or if $v_{ref} > v_{set}$, then $v_{ref}$ is ramped towards $v_{set}$ by means of equation (1). On segments in the "gentle downgrade" category, $v_{ref}$ is allowed to vary between $v_{set}$ and $v_{max}$ when a new segment is incorporated, i.e. $v_{set} \leq v_{ref} \leq v_{max}$, and if $v_{ref} \leq v_{max}$ no retardation of the vehicle is effected. If however $v_{ref} > v_{max}$, then $v_{ref}$ is decreased to $v_{max}$ during the segment, or if $v_{ref} < v_{set}$, then $v_{ref}$ is ramped towards $v_{set}$ by means of equation (1). The five segment categories above may be simplified to three by deleting "gentle upgrade" and "gentle downgrade". The "level road" category will then cover a larger range bounded by the calculated threshold values $l_{min}$ and $l_{max}$, i.e. the gradient on the segment has to be smaller than $l_{min}$ if the gradient is negative or greater than $l_{max}$ if the gradient is positive.

When a segment which comes after a segment within the horizon which is in the "gentle upgrade" or "gentle downgrade" category causes a change in the entry speeds to segments in those categories, it may mean that entry speeds and hence the set-point speeds for the control system are corrected and become higher or lower than as indicated by the above rules for the "gentle upgrade" or "gentle downgrade" categories. This therefore applies when the entry speeds to segments are corrected to cater for subsequent segments.

All speed changes requested are therefore ramped by means of Torricelli's equation (1) so that they take place with comfort requirement. Thus it is a general rule not to raise the set-point speed $v_{ref}$ on an upgrade, since any possible speed increase of $v_{ref}$ has to take place before the climb begins if the vehicle is to be driven in a cost-effective way. For the same reason, the set-point speed $v_{ref}$ should not be lowered on a downgrade, since any possible speed decrease of $v_{ref}$ has to take place before the downhill run.

By continuously stepping through all the segments within the horizon, it is possible to determine an internal horizon which provides predicted initial values $v_i$ for each segment. According to an embodiment, step A) is performed continuously so long as the horizon does not exceed a planned itinerary for the vehicle, and steps B) to E) are performed continuously for the whole length of the horizon. The horizon is updated preferably piecemeal, and has according to an embodiment not the same continuity in its updating as steps B) to E). The internal horizon is updated continually as new segments are added to the horizon, e.g. two to three times per second. Continuous stepping through segments within the horizon involves continuously calculating the initial values $v_i$ for each segment, and calculating an initial value $v_i$ may entail having to change initial values both forwards and backwards within the internal horizon. Where for example a predicted speed in a segment is outside a set range, it is desirable to correct the speed in preceding segments.

Figure 3:
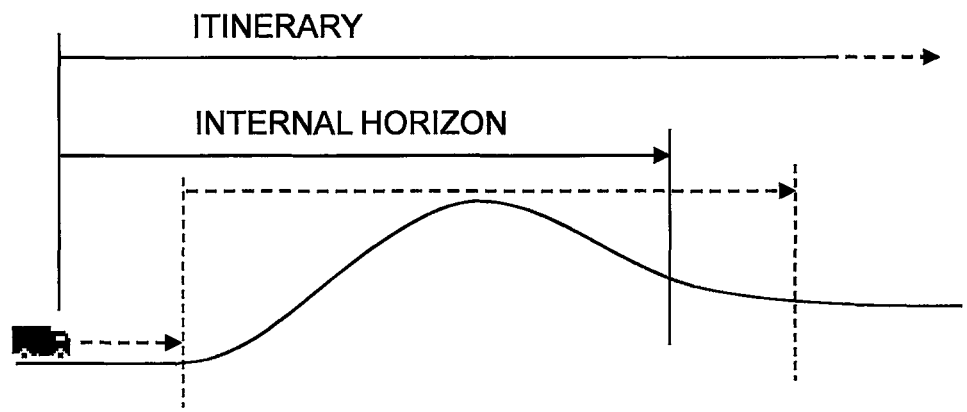
FIG. 3 illustrates the length of a control system's horizon in relation to the length of the itinerary for the vehicle.
Figure 4:
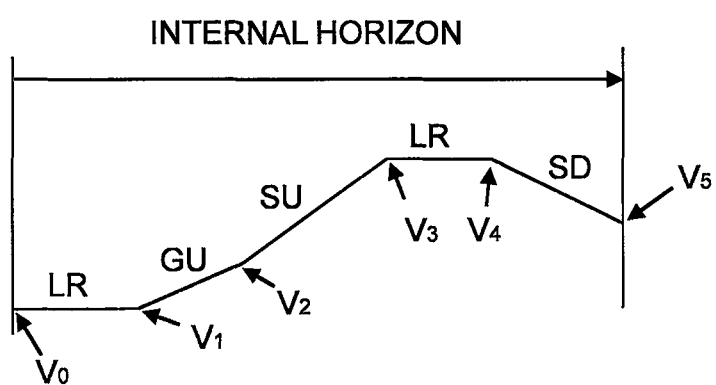
FIG. 4 illustrates the various speeds predicted and the categories of segments which are continuously updated as new segments are added to the horizon

FIG. 3 depicts the internal horizon relative to the itinerary. The internal horizon moves continually forward as indicated by the broken lines which show the internal horizon moved forward. FIG. 4 depicts an example of an internal horizon in which the various segments are placed in categories. In the diagram "LR" stands for "level road", "GU" for "gentle upgrade", "SU" for "steep upgrade", "SD" for "steep downgrade". The speed is initially $v_0$, and if this is not $v_{set}$, the set-point values are ramped from $v_0$ to $v_{set}$ with comfort acceptance according to Torricelli's equation (1) because the category is "level road". The next segment is a "gentle upgrade" and no change of $v_{ref}$ takes place so long as $v_{min} \leq v_{ref} \leq v_{set}$, since no acceleration need be applied in this segment. The next segment is a "steep upgrade", so the final speed $v_3$ for it is predicted by means of formula (2), so $v_2$ has to be increased if $v_3 < v_{min}$ according to formula (9). The next segment is "level road", so $v_{ref}$ is changed towards $v_{set}$ with limitation of the comfort requirement from Torricelli's equation (1). Thereafter comes a segment which is a "steep downgrade", so the final speed $v_5$ is predicted by means of formula (2) and $v_4$ has to be decreased if $v_5 > v_{max}$ according to formula (10). As soon as a speed backward in the internal horizon is changed, the remaining speeds backward in the internal horizon are adjusted to be able to fulfill the speed further forward. At each speed change which has to be effected, the method according to the invention calculates by means of Torricelli's equation (1) whether it is possible to achieve the speed change with comfort requirement. If not, the entry speed to the segment is adjusted so that comfort requirement can be maintained.

The present invention is not limited to the embodiments described above. Various alternatives, modifications and equivalents may be used. The aforesaid embodiments therefore do not limit the scope of the invention which is defined by the attached claims.

The invention claimed is:

1. A module for determining speed set-point values, $v_{ref}$, for a vehicle's control systems, comprising
    an input unit configured to input a reference speed, $v_{set}$, which is the speed desired by a driver of the vehicle,
    a horizon unit configured to determine a horizon by means of received position data and map data of an itinerary made up of route segments with at least one characteristic assigned for each route segment; and
    a processor unit configured to calculate $v_{ref}$ across the horizon according to rules pertaining to categories in which route segments within the horizon are placed, so that $v_{ref}$ is within a range bounded by $v_{min}$ and $v_{max}$, where $v_{min} \leq v_{set} \leq v_{max}$, $v_{ref}$ being determined such that the vehicle's control systems control the engine of the vehicle so that the speed of the vehicle at least approaches the speed $v_{ref}$;
    the processor unit being further configured to determine a control signal with one or more control parameters for the vehicle's automatic gear change control unit, based on one or more vehicle-specific values, which vary as the vehicle's state varies over time, and a calculated speed set-point value $v_{ref}$ across the horizon, the speed set-point value $v_{ref}$ being continuously calculated and updated, the speed set-point value $v_{ref}$ being a function of how the one or more vehicle-specific values vary along the itinerary.

2. A module according to claim 1, in which the processor unit is further configured to calculate engine load and engine speed across the horizon on the basis of one or more vehicle-specific values, and to use the calculated engine load and/or engine speed to determine the one or more control parameters.

3. A module according to claim 1, in which the one or more control parameters comprise one or more of the following:
    speed limits of an engine of the vehicle for changing gear, distance from the vehicle to a crest of a hill, and average gradient of the hill.

4. A module according to claim 1, in which the one or more control parameters comprise one or more of the following:
    a lowest engine speed limit of the vehicle for changing of gear downward;
    a flag indicating that an upward change of gear should not take place;
    a gradient of a current segment and remaining distance to a segment classified as a "gentle upgrade" if the vehicle is on a segment classified as a "steep upgrade";
    a desired speed at a transition to a segment classified as a "gentle upgrade" if the vehicle is on a segment classified as a "steep upgrade".

5. A module according to claim 1, in which the processor unit is further configured:
    to calculate threshold values for the at least one characteristic of each segment according to the one or more vehicle-specific values, wherein the threshold values serve as boundaries for assigning segments to different categories;
    and to compare at least one characteristic of each segment with the calculated threshold values and placing each segment in a category according to the results of the comparisons.

6. A module according to claim 1, in which the one or more vehicle-specific values are determined by a current transmission ratio, a current vehicle weight, the maximum torque curve of an engine of the vehicle, mechanical friction and/or the vehicle's running resistance at a current speed.

7. A module according to claim 1, in which the at least one characteristic of each segment includes a length and a gradient of each segment and the processor unit is configured to calculate threshold values in the form of gradient threshold values $l_{min}$ and $l_{max}$.

8. A module according to claim 1, in which the at least one characteristic of each segment includes a length and a gradient of each segment and the processor unit is configured to calculate threshold values in the form of lateral acceleration threshold values.

9. A module according to claim 1, wherein the position data is determined by using a global positioning system (GPS).

10. A module according to claim 1, in which the horizon unit is configured to update the horizon continuously so long as the horizon does not exceed a planned itinerary for the vehicle, and in which the processor unit is further configured to continuously perform steps to calculate and update the speed set-point values, $v_{ref}$, for the vehicle's control systems for a whole length of the horizon.

11. A module according to claim 1, wherein an initial speed for each route segment within the horizon is set.

12. A module according to claim 11, wherein the initial speeds of the route segments within the horizon are adjusted as necessary within a range of the reference speed, $v_{set}$, as new route segments are added to the horizon.

13. The module according to claim 1, wherein $v_{min}$ and $v_{max}$ are set automatically by calculation of suitable ranges.

14. A module for determining speed set-point values, $v_{ref}$, for a vehicle's control systems, comprising
    an input unit configured to input a reference speed, $v_{set}$, which is the speed desired by a driver of the vehicle,
    a horizon unit configured to determine at least two horizons by means of received position data and map data of an itinerary made up of route segments with at least one characteristic assigned for each route segment; and
    a processor unit configured to calculate $v_{ref}$ across a respective horizon according to rules pertaining to categories in which route segments within the horizon are placed, so that $v_{ref}$ is within a range bounded by $v_{min}$ and $v_{max}$, where $v_{min} \leq v_{set} \leq v_{max}$, $v_{ref}$ being determined such that the vehicle's control systems control the engine of the vehicle so that the speed of the vehicle at least approaches the speed $v_{ref}$;
    the processor unit being further configured to determine a control signal with one or more control parameters for:
    (1) the vehicle's automatic gear change control unit, based on one or more vehicle-specific values and a calculated speed set-point value $v_{ref}$ across the respective horizon; and
    (2) at least the vehicle's cruise control,
    a respective horizon being determined for each of the vehicle's automatic gear change control unit, and the vehicle's cruise control.

15. The module according to claim 14, wherein $v_{min}$, and $v_{max}$ are set automatically by calculation of suitable ranges.

16. A module for determining speed set-point values, $v_{ref}$, for a vehicle's control systems, comprising an input unit configured to input a reference speed, $v_{set}$, which is the speed desired by a driver of the vehicle, a horizon unit configured to determine a horizon by means of received position data and map data of an itinerary made up of route segments with at least one characteristic assigned for each route segment; and a processor unit configured to calculate $v_{ref}$ across the horizon according to rules pertaining to categories in which route segments within the horizon are placed, so that $v_{ref}$ is within a range bounded by $v_{min}$ and $v_{max}$, where $v_{min} \leq v_{set} \leq v_{max}$, $v_{ref}$ being determined such that the vehicle's control systems control the engine of the vehicle so that the speed of the vehicle at least approaches the speed $v_{ref}$;

the processor unit being further configured to determine a control signal with one or more control parameters for the vehicle's automatic gear change control unit, based on one or more vehicle-specific values and a calculated speed set-point value $v_{ref}$ across the horizon, wherein the horizon is updated continuously by:

(1) adding new route segments so long as the horizon does not exceed a planned itinerary for the vehicle; and (2) continuous stepping through the route segments within the horizon involving continuously calculating the initial speed of the vehicle $v_i$ for each route segment.

17. The module according to claim 16, wherein $v_{min}$ and $v_{max}$ are set automatically by calculation of suitable ranges.

* * * * *